United States Patent
Kaufman et al.

(10) Patent No.: US 10,836,375 B2
(45) Date of Patent: Nov. 17, 2020

(54) POWERTRAIN CONFIGURATIONS FOR SINGLE-MOTOR, TWO-CLUTCH HYBRID ELECTRIC VEHICLES

(71) Applicant: CUMMINS ELECTRIFIED POWER NA INC., Wilmington, DE (US)

(72) Inventors: Patrick Kaufman, Davis, CA (US); Chan-Chiao Lin, Davis, CA (US); Andrew Frank, Davis, CA (US)

(73) Assignee: CUMMINS ELECTRIFIED POWER NA INC., Wilmington, DE (US)

( * ) Notice: Subject to any disclaimer, the term of this patent is extended or adjusted under 35 U.S.C. 154(b) by 0 days.

(21) Appl. No.: 14/104,891

(22) Filed: Dec. 12, 2013

(65) Prior Publication Data

US 2014/0228168 A1 Aug. 14, 2014

Related U.S. Application Data

(63) Continuation-in-part of application No. 13/762,731, filed on Feb. 8, 2013, now Pat. No. 9,045,136, and a
(Continued)

(51) Int. Cl.
*B60W 20/20* (2016.01)
*B60K 6/442* (2007.10)
(Continued)

(52) U.S. Cl.
CPC ............ *B60W 20/20* (2013.01); *B60K 6/442* (2013.01); *B60K 6/48* (2013.01); *B60K 6/543* (2013.01);
(Continued)

(58) Field of Classification Search
USPC .............. 701/1, 22, 99; 180/65.1–65.8; 903/902–960
See application file for complete search history.

(56) References Cited

U.S. PATENT DOCUMENTS 5,343,970 A * 9/1994 Severinsky ............ B60K 6/387
180/65.25
5,845,731 A 12/1998 Buglione
(Continued)

FOREIGN PATENT DOCUMENTS

CN 101209667 A 7/2008
CN 102114766 A 7/2011
(Continued)

OTHER PUBLICATIONS

International Search Report and Written Opinion in PCT/US2014/014234, dated Aug. 12, 2014.
(Continued)

*Primary Examiner* — Rami Khatib
(74) *Attorney, Agent, or Firm* — Faegre Drinker Biddle & Reath LLP

(57) ABSTRACT

Powertrain configurations for hybrid electric vehicles (HEV) and plug-in hybrid electric vehicles (PHEV) are disclosed. One powertrain comprises: a prime mover; an electric motor-generator, said electric motor-generator mechanically coupled to said prime mover via a first clutch; a transmission, said transmission mechanically coupled to said electric motor-generator via a second clutch; a battery, said battery electrically coupled to said electric motor-generator, said battery capable of supplying electrical energy to said electric motor-generator; and a controller, said controller capable of supplying control signals to said prime mover, said first clutch, said electric motor-generator, said second clutch and said transmission such that said controller is capable of dynamically affecting a plurality of operating modes. Manual control modes for the vehicle and transmission of the HEV or PHEV are used for the purpose of optimizing power, efficiency and the use of either one of the energy sources obtained from off-board sources.

11 Claims, 9 Drawing Sheets

Related U.S. Application Data continuation-in-part of application No. 13/762,860, filed on Feb. 8, 2013, now Pat. No. 9,421,856, and a continuation-in-part of application No. 13/914,295, filed on Jun. 10, 2013, now Pat. No. 10,384,527.

(51) Int. Cl.

| | |
|---|---|
| *B60W 50/08* | (2020.01) |
| *B60W 20/40* | (2016.01) |
| *B60K 6/48* | (2007.10) |
| *B60K 6/543* | (2007.10) |
| *B60K 6/547* | (2007.10) |
| *B60W 30/182* | (2020.01) |
| *B60W 20/13* | (2016.01) |

(52) U.S. Cl.
CPC ............ *B60K 6/547* (2013.01); *B60W 20/13* (2016.01); *B60W 20/40* (2013.01); *B60W 30/182* (2013.01); *B60W 50/082* (2013.01); *B60W 2510/244* (2013.01); *B60W 2540/215* (2020.02); *Y02T 10/62* (2013.01); *Y02T 90/14* (2013.01); *Y10S 903/946* (2013.01); *Y10T 477/26* (2015.01)

(56) References Cited

U.S. PATENT DOCUMENTS

| | | |
|---|---|---|
| 5,856,709 A | 1/1999 | Ibaraki |
| 5,982,045 A | 11/1999 | Tabata |
| 6,026,921 A | 2/2000 | Aoyama et al. |
| 6,048,289 A | 4/2000 | Hattori et al. |
| 6,054,844 A | 4/2000 | Frank |
| 6,081,042 A | 6/2000 | Tabata |
| 6,083,139 A | 7/2000 | Deguchi et al. |
| 6,116,363 A | 10/2000 | Frank |
| 6,190,282 B1 | 2/2001 | Deguchi et al. |
| 6,328,122 B1 | 12/2001 | Yamada |
| 6,432,023 B1 | 8/2002 | Ahner et al. |
| 6,569,055 B2 | 5/2003 | Urasawa et al. |
| 6,740,002 B1* | 5/2004 | Stridsberg ............ B60K 6/405 477/14 |
| 6,809,429 B1 | 10/2004 | Frank |
| 6,837,215 B2 | 1/2005 | Nishigaki et al. |
| 6,847,189 B2 | 1/2005 | Frank |
| 6,885,113 B2 | 4/2005 | Lim |
| 6,886,648 B1 | 5/2005 | Hata et al. |
| 6,931,850 B2 | 8/2005 | Frank |
| 6,991,054 B2 | 1/2006 | Takaoka et al. |
| RE39,023 E | 3/2006 | Sasaki |
| 7,021,409 B2 | 4/2006 | Tamor |
| 7,040,433 B2 | 5/2006 | Yamamoto et al. |
| 7,117,963 B2 | 10/2006 | Saito et al. |
| 7,154,236 B1 | 12/2006 | Heap |
| 7,163,480 B2 | 1/2007 | Supina et al. |
| 7,169,074 B2 | 1/2007 | Raghaven et al. |
| 7,196,430 B2 | 3/2007 | Yang |
| 7,217,205 B2 | 5/2007 | Frank |
| 7,249,537 B2 | 7/2007 | Lee et al. |
| 7,261,672 B2 | 8/2007 | Frank |
| 7,315,090 B2 | 1/2008 | Yang |
| 7,467,678 B2 | 12/2008 | Tanaka et al. |
| 7,597,164 B2 | 10/2009 | Severinsky et al. |
| 7,632,202 B2 | 12/2009 | Supina et al. |
| 7,713,166 B2 | 5/2010 | Frank |
| 7,740,119 B2 | 6/2010 | Staudinger |
| 7,908,067 B2 | 3/2011 | Soliman et al. |
| 8,028,778 B2 | 10/2011 | Luo et al. |
| 8,056,663 B2 | 11/2011 | Schoenek |
| 8,057,354 B2 | 11/2011 | Frank |
| 8,062,172 B2 | 11/2011 | Supina et al. |
| 8,083,016 B2 | 12/2011 | Naik et al. |
| 8,152,671 B2 | 4/2012 | Tiwari |
| 8,215,425 B2 | 7/2012 | Hayashi et al. |
| 8,215,426 B2 | 7/2012 | Katsuta et al. |
| 8,234,025 B2 | 7/2012 | Conlon |
| 8,251,850 B2 | 8/2012 | Phillips |
| 8,307,924 B2 | 11/2012 | Wang et al. |
| 8,474,556 B2 | 7/2013 | Wang et al. |
| 8,540,601 B2 | 9/2013 | Wang et al. |
| 8,833,324 B2 | 9/2014 | O'Brien et al. |
| 8,845,482 B2 | 9/2014 | Zhang et al. |
| 8,997,480 B1* | 4/2015 | Bennett ............ F16H 9/26 60/487 |
| 9,045,136 B2 | 6/2015 | Frank et al. |
| 9,421,856 B2 | 8/2016 | Frank et al. |
| 9,849,869 B2 | 12/2017 | Frank et al. |
| 10,369,878 B2 | 8/2019 | Frank et al. |
| 10,384,667 B2 | 8/2019 | Frank et al. |
| 2001/0039230 A1* | 11/2001 | Severinsky ............ B60H 1/004 477/3 |
| 2006/0048983 A1 | 3/2006 | Urakabe |
| 2007/0276556 A1 | 11/2007 | Houle |
| 2008/0071446 A1 | 3/2008 | Brauner et al. |
| 2008/0096717 A1 | 4/2008 | Houle |
| 2008/0223636 A1 | 9/2008 | Gutsche |
| 2008/0223637 A1 | 9/2008 | Bartilson |
| 2008/0223837 A1 | 9/2008 | Bruland et al. |
| 2008/0300743 A1 | 12/2008 | Conlon et al. |
| 2009/0145674 A1 | 6/2009 | Lee |
| 2009/0221390 A1 | 9/2009 | Houle |
| 2010/0099532 A1 | 4/2010 | Cashen |
| 2011/0287888 A1 | 11/2011 | Muller |
| 2011/0305550 A1 | 12/2011 | Haire |
| 2012/0077632 A1* | 3/2012 | Babbitt ............ B60K 6/12 475/1 |
| 2012/0198962 A1 | 8/2012 | Houle |
| 2012/0309587 A1 | 12/2012 | Nozaki |
| 2013/0072347 A1* | 3/2013 | Birkhold ............ B60K 6/387 477/5 |
| 2013/0138283 A1 | 5/2013 | Cho |
| 2013/0173111 A1 | 7/2013 | Syed et al. |
| 2013/0173128 A1 | 7/2013 | Syed et al. |
| 2013/0247870 A1* | 9/2013 | Sauvlet ............ B60K 6/48 123/352 |
| 2013/0324357 A1 | 12/2013 | Stenson |
| 2014/0228165 A1 | 8/2014 | Frank et al. |
| 2014/0228166 A1* | 8/2014 | Heap ............ B60W 20/00 477/5 |
| 2014/0228167 A1 | 8/2014 | Frank et al. |
| 2014/0256505 A1* | 9/2014 | Dalum ............ B60K 6/12 477/3 |
| 2018/0118187 A1 | 5/2018 | Frank et al. |

FOREIGN PATENT DOCUMENTS

| | | |
|---|---|---|
| CN | 102381177 | 3/2012 |
| CN | 204136757 | 2/2015 |
| JP | 2011025858 | 2/2011 |
| WO | 2009/009822 A1 | 1/2009 |
| WO | 2009109822 | 9/2009 |
| WO | 2012082063 | 6/2012 |
| WO | 2012152613 | 11/2012 |

OTHER PUBLICATIONS

Adel, B et af., "Simulation and Comparison of HEY Battery Control for Best Fuel Economy and Longer Battery Life", World Electric Vehicle Journal, ISSN 2032-6653, Nov. 5-9, 2010, vol. 4, pp. 000421-0\)0426 [online], [retrieved on May 5, 2014]. Retrieved from the Internet: <URL: http://www.evs24.org/wevajournallphp/download.php?f=voi4/WEVA4-4060.pdf>; introduction.

International Search Report in PCT/US2014/014215.

Written Opinion in PCT/US2014/014215.

International Written Opinion, issued by the ISA/US, Commissioner for Patents, dated Aug. 12, 2014, for International Application No. PCT/US2014/014234; 12 pages.

Adel, B et al., "Simulation and Comparison of HEV Battery Control for Best Fuel Economy and Longer Battery Life," World Electric Vehicle Journal, vol. 4, (2010) pp. 421-426.

(56) References Cited

OTHER PUBLICATIONS

International Preliminary Report on Patentability issued by the International Bureau of WIPO, dated Aug. 11, 2015, for International Application PCT/US2014/014215; 13 pages.
International Preliminary Report on Patentability issued by the International Bureau of WIPO, dated Aug. 11, 2015, for International Application PCT/US2014/014234; 13 pages.
International Search Report and Written Opinion in PCT/US2014/014251, dated Sep. 26, 2014.

* cited by examiner

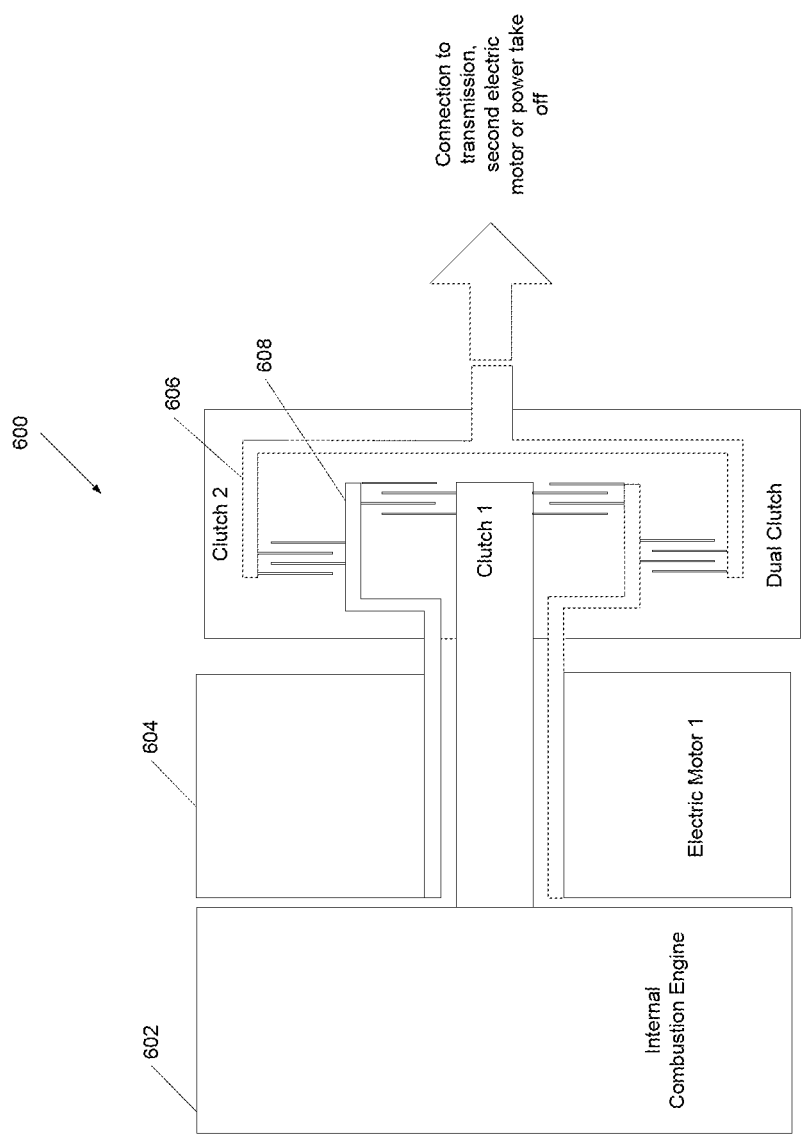

POWERTRAIN CONFIGURATIONS FOR SINGLE-MOTOR, TWO-CLUTCH HYBRID ELECTRIC VEHICLES

CROSS-REFERENCE TO RELATED APPLICATIONS

The present application is a Continuation In Part (CIP) application of, and takes the benefit of: (1) U.S. patent application Ser. No. 13/914,295 filed on Jun. 10, 2013 and entitled "FOUR WHEEL POWERTRAIN CONFIGURATIONS FOR TWO-MOTOR, TWO-CLUTCH HYBRID ELECTRIC VEHICLES"; (2) U.S. patent application Ser. No. 13/762,731 filed on Feb. 8, 2013 and entitled "SYSTEMS AND METHODS FOR IMPLEMENTING DYNAMIC OPERATING MODES AND CONTROL POLICIES FOR HYBRID ELECTRIC VEHICLES"; (3) U.S. patent application Ser. No. 13/762,860 filed on Feb. 8, 2013 and entitled "POWERTRAIN CONFIGURATIONS FOR TWO-MOTOR, TWO-CLUTCH HYBRID ELECTRIC VEHICLES"—all of which are hereby incorporated by reference.

BACKGROUND

In the field of electric vehicles (EVs), hybrid electric vehicles (HEVs) and plug-in hybrid electric vehicles (PHEVs), there are many possible powertrains that may affect a wide variety of operating modes. For example, in the field of HEVs alone, HEV powertrains may be constructed to affect series, parallel, series-parallel modes of operation. In addition, certain of these modes may be constructed to operate according to different policies, —e.g., charge-sustaining, charge-depletion and the like.

These different modes and policies offer certain advantages—e.g., electric range extension, vehicle responsiveness to driver inputs, fuel efficiency, operation of the internal combustion engine (ICE) on its ideal-operating line (IOL). It would be desirable to have a single powertrain that may affect a plurality of these modes—possibly during different drive conditions and possibly with different policies, according to a desired drive characteristic metric, such as fuel efficiency, range extension, efficient battery usage or the like.

In addition, it may be desirable to have a hybrid electric powertrain configuration that has substantially the same form factor for conventional passenger cars and light-to-heavy-duty truck vehicle configurations. In such a case, the cost to produce advanced hybrid electric vehicles may be reduced by substitution without costly changes to the production line.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Some embodiments of the present application provide for powertrain configurations for hybrid electric vehicles (HEV) and plug-in hybrid electric vehicles (PHEV). In one embodiment, a powertrain comprises: a prime mover; an electric motor-generator, said electric motor-generator mechanically coupled to said prime mover via a first clutch; a transmission, said transmission mechanically coupled to said electric motor-generator and/or the prime mover via a second clutch; a battery, said battery electrically coupled to said electric motor-generator, said battery capable of supplying electrical energy to said electric motor-generator; and a controller, said controller capable of supplying control signals to said prime mover, said first clutch, said electric motor-generator, said second clutch and said transmission such that said controller is capable of dynamically affecting a plurality of operating modes; wherein further said plurality of operating modes comprises one of a group, said group comprising: auto mode, EV mode, parallel hybrid mode, standing recharge mode and ICE mode. In some embodiments, manual control modes for the vehicle and transmission of the HEV or PHEV may be used for the purpose of optimizing power, efficiency and the use of either one of the energy sources obtained from off-board sources. In the case of PHEVs, these energies may be either electric energy stored in a high voltage battery or carbonaceous fuel stored in a fuel tank.

In other embodiments, the powertrain further comprises a housing that contains at least two or more components of the powertrain. One such housing is mechanically mated to the vehicle and provides housing to at least one or more components of the powertrain. Such a housing may provide for environmental protection, shock protection, electro-magnetic interference protection to such powertrain components.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 6 depicts one possible embodiment of a powertrain architecture comprising a simplified clutch.

DETAILED DESCRIPTION

Figure 1:
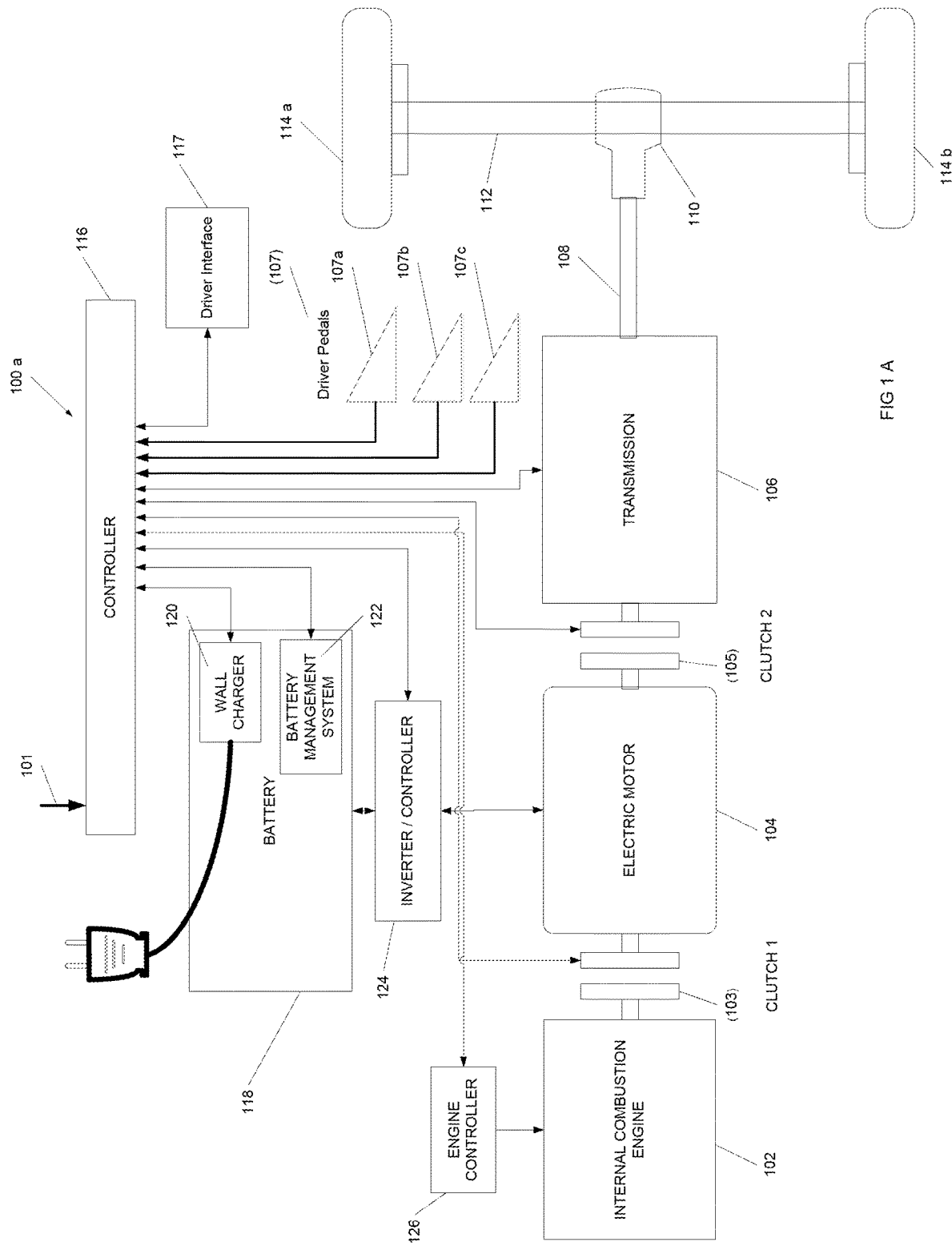
FIGS. 1A through 1D show various possible embodiments of a single motor powertrains for hybrid electric vehicles (HEVs) and plug-in hybrid electric vehicle (PHEVs), as made according to the principles of the present application.
Figure 1:
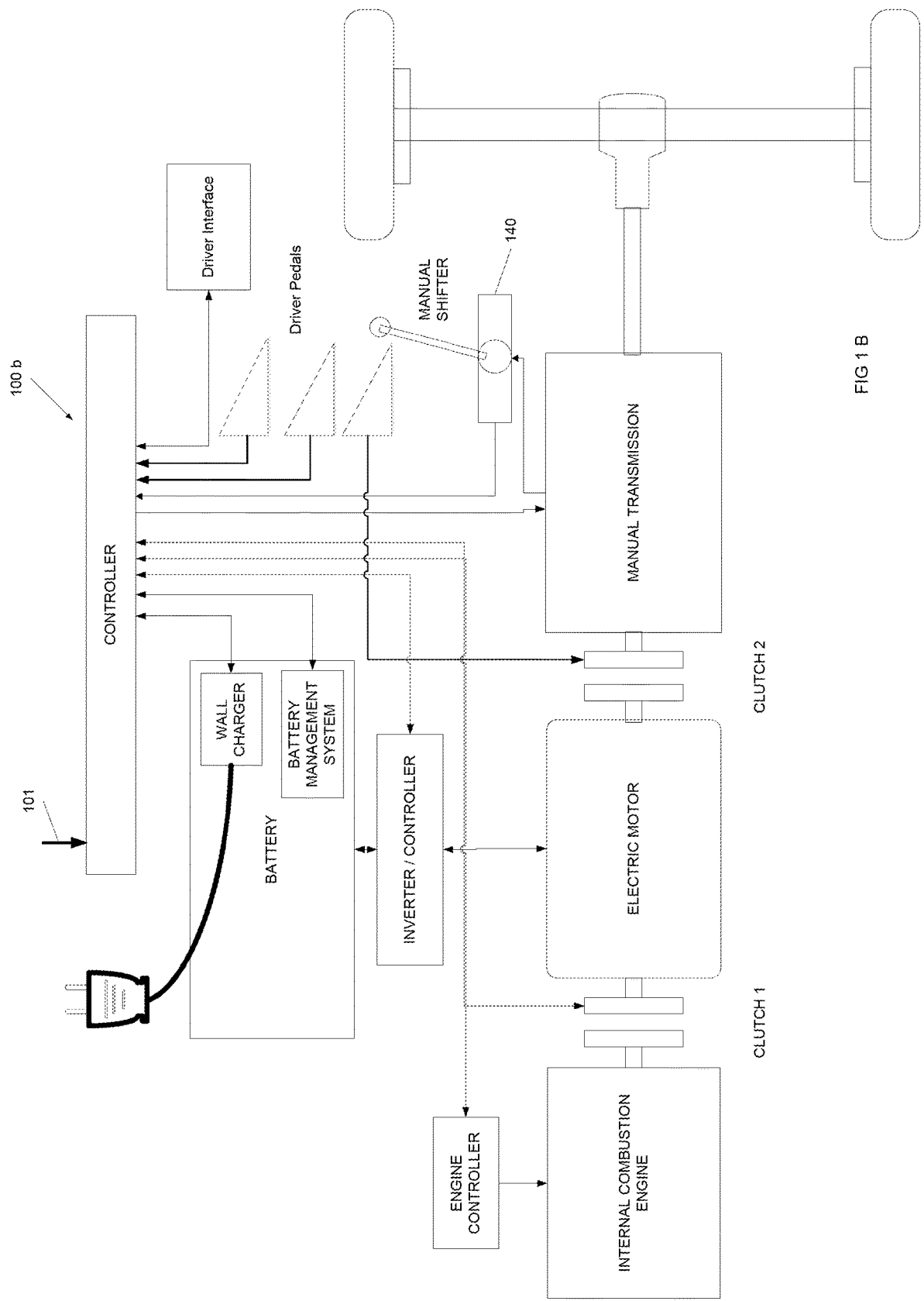
Figure 1:
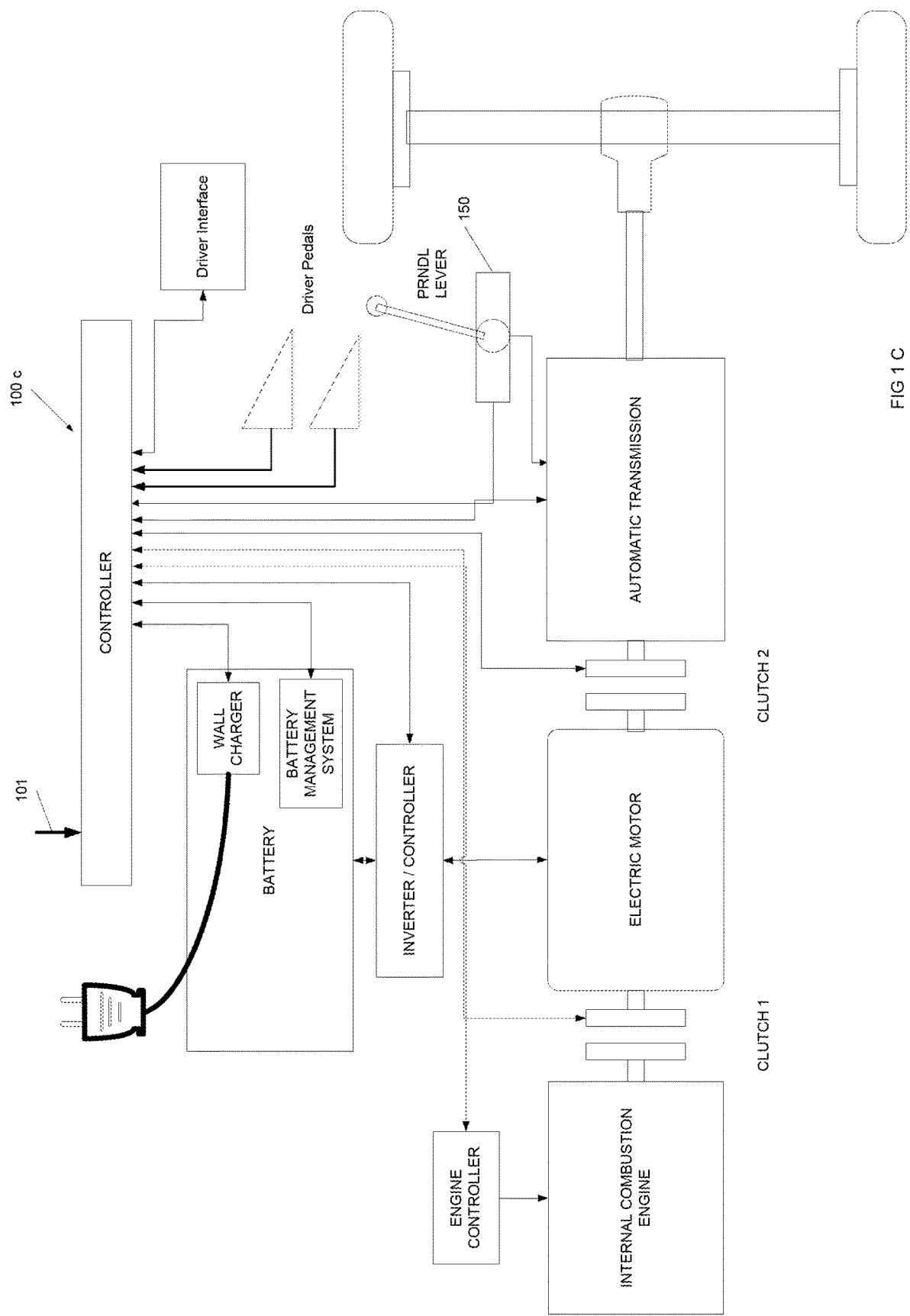
Figure 1:
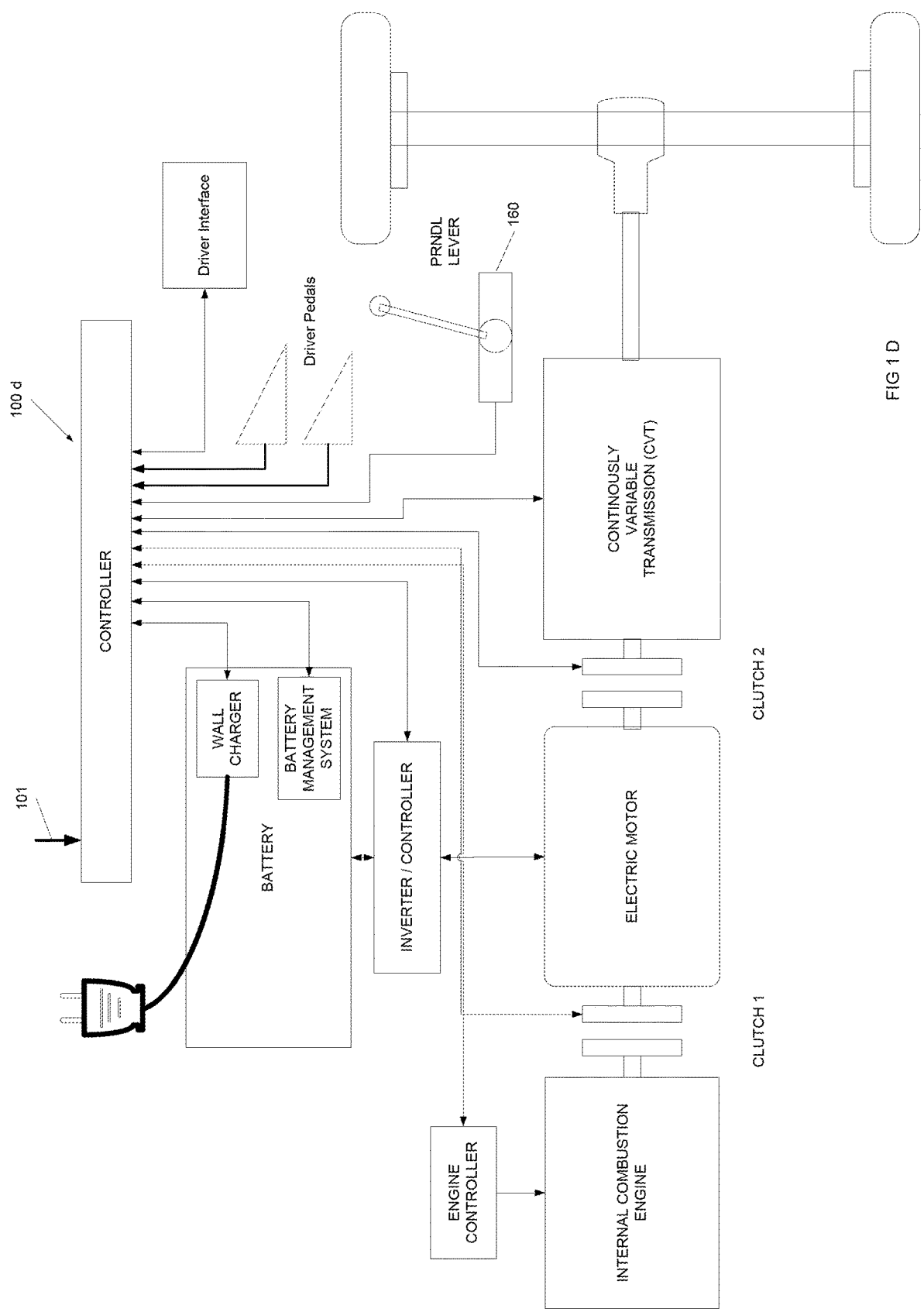

As utilized herein, terms "controller," "system," "interface," and the like are intended to refer to a computer-related entity, either hardware, software (e.g., in execution), and/or firmware. For example, a controller can be a process running on a processor, a processor, an object, an executable, a program, and/or a computer. By way of illustration, both an application running on a server and the server can be a controller. One or more controllers can reside within a process and a controller can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Introduction

In the following co-owned patent applications, there are described therein powertrain configurations that comprise an Internal Combustion Engine (ICE)—or some other suitable prime mover (e.g., fuel cell, hydrogen engine and any other known mover and possible fuel to drive it)—and two electric motors and dual clutches to affect a variety of operating modes:

(1) United States Published Patent Application Number 20140229043 (application Ser. No. 13/762,731), filed on 2 Aug. 2013 and entitled "SYSTEMS AND METHODS FOR IMPLEMENTING DYNAMIC OPERATING MODES AND CONTROL POLICIES FOR HYBRID ELECTRIC VEHICLES";
(2) United States Published Patent Application Number 20140228165 (application Ser. No. 13/762,860) filed on 2 Aug. 2013, and entitled "POWERTRAIN CONFIGURATIONS FOR TWO-MOTOR, TWO-CLUTCH HYBRID ELECTRIC VEHICLES"; and
(3) United States Published Patent Application Number 20140228167 (application Ser. No. 13/914,295) filed on 6 Oct. 2013, and entitled "FOUR WHEEL DRIVE POWERTRAIN CONFIGURATIONS FOR TWO-MOTOR, TWO-CLUTCH HYBRID ELECTRIC VEHICLES";
    all of which are hereby incorporated by reference in their entirety.

While these powertrain designs may comprise one ICE and two electric motors, it may be desirable to employ a simpler (and perhaps less expensive) powertrain configuration that may comprise a single ICE, a single electric motor—that may be actuated by two clutches to work together with a transmission.

For several alternative embodiments herein, powertrain configurations are provided herein that comprise a number of components that may further comprise the physical powertrain of Hybrid Electric Vehicles (HEV) and Plug-in Hybrid Electric Vehicles (PHEVs) alike. For example, in many embodiments, there may comprise a gasoline engine—or alternatively, fuel cell or some other Prime Mover (PM) that runs on some form of fuel (e.g., gaseous or liquid or the like). In addition, there may be one or more Electric Motors (EM or M) to provide motive power via stored electrical energy in a battery, capacitor, supercapacitor or the like.

With this simpler powertrain design, it would still be desirable to affect as many modes of hybrid electric drive as possible—thus, enabling a wide range of fuel economy and performance characteristics as might be desired by a driver of the vehicle.

Physical Layout:

FIG. 1A is one possible embodiment of a powertrain architecture that may be suitable for the purposes of the present application. As may be seen in the embodiment of FIG. 1A, the components of the drivetrain 100a may be connected mechanically to each other in series. Torque may be transmitted through shafts (e.g., 108) coupling one component to the next. The component chain may be as follows: the combustion engine (ICE) 102, clutch (C1) 103, electric motor (EM) 104, clutch (C2) 105, and finally a transmission 106.

Transmission output may be a shaft 108 connecting to a drive axle/differential 110 with a final drive ratio, thus ultimately connecting the traction devices to the wheels (114a and 114b) of the vehicle. Both clutches may be dry clutches, wet clutches or any other known in the art. The clutch C1 is controlled by the controller/Powertrain Control Unit (PCU) 116. The clutch actuation may be powered in many ways including: electro-hydraulic, servo-pneumatic, electro-magnetic, etc.

Controller/PCU 116 may comprise one or more processors, and computer readable memory wherein computer readable instructions may be stored. Controller, while reading such computer readable instructions, may send out control signals to the various components of the powertrain (as shown in FIG. 1). In addition, controller may receive input signals—e.g., from sensors that may be resident within all or several of the powertrain components. Such signals may include, but are not limited to: vehicle speed, State of Charge (SOC), State of Battery Health, shaft speed, torque, temperature (e.g., outside and operating temperatures of the various components). In addition, controller 116 may receive driver input signals 107a (brake pedal), 107b (accelerator pedal) and 107c (clutch pedal). Controller 116 may also receive other signals 101 from other sources, external or internal to the vehicle.

Driver interface 117 may provide vehicle status to the driver by a multitude of displays, gauges and sensors. For example, vehicle speed, torque, SOC, available fuel level, drivetime efficiency indications, transmission gear, and many others may be provided to the driver via any known means of presenting information to the driver.

In addition to providing status and information to the driver, driver interface 117 may optionally provide a way for the driver to input desired drive characteristics and/or modes. For example, driver interface 117 may be a module that allows the driver to force the drivetrain into certain modes—e.g., EV mode. This may be desirable for drivers of garbage trucks, utility vehicles, delivery trucks and any other vehicle where it may be desirable to affect a style of driving (e.g., in residential areas, one mode may be quieter and less exhaust polluting than another). In another embodiment, it may be possible to affect and override loop to disable this function in certain cases—e.g., in case the SOC is critically low, or there is a particular fault indication. It may also be desirable to disable standing recharge at some points in the drive cycle as well. In addition to receiving driver input, driver interface may optionally provide driving, mode and/or shift recommendations to the driver, based on algorithm determination of a potential optimal way of driving the vehicle (e.g., based on certain drive/vehicle characteristics, vehicle speed, torque, SOC, etc. and/or possible fault conditions).

Powertrain 100a may also comprise a battery 118 (e.g. of any type and technology known or unknown), a wall charger 120 (together with an plug to charge from an external source, not shown), a battery management system 122 (as is known in the art). Both the ICE and the EM may have separate controllers 126 and 124, respectively—that may also communicate with controller 116.

In several embodiments, transmission 106 may comprise a driveshaft 108 for transmitting power from the ICE and/or EM to differential 110, along an axle 112 to drive wheels 114a and 114b. It will be appreciated the powertrain may be configured to be rear wheel drive, front wheel drive and/or all-wheel drive, as desired.

FIGS. 1B through 1D depict different embodiments of HEVs and PHEVs powertrains (100b, 100c and 100d) as made in accordance with the principles of the present application. FIG. 1B depicts one embodiment with a manual transmission 106—which may be controlled by the driver with a manual shifter 140. Control lines may run by and between shifter 140, controller 116 and manual transmission 106, as desired, to affect the desired control of the vehicle.

FIG. 1C depicts one embodiment with an automatic transmission 106—which may be controlled by a PRNDL lever 150. Control lines may run by and between lever 150, controller 116 and automatic transmission 106, as desired, to affect the desired control of the vehicle.

FIG. 1D depicts one embodiment with a continuously variable transmission 106—which may be controlled by a PRNDL lever 160. Control lines may run by and between lever 160, controller 116 and continuously variable transmission 106, as desired, to affect the desired control of the vehicle.

Other Powertrain Embodiments

In several alternative embodiments, the second clutch C2 may either be controlled by the PCU 116—or by a mechanical linkage to a clutch pedal operated by the driver (e.g., as in a manual transmission). If C2 is controlled by the PCU, an electronic pedal with position sensor may be installed in place of the traditional clutch pedal. This implementation is called "clutch by wire" and may provide several advantages over the traditional mechanical linkage of C2 to a driver operated clutch pedal. In some embodiments, the system may prevent the driver from making a mistake that may damage the vehicle or at least some of its drive components, or jeopardize the vehicle dynamic behavior.

In one embodiment, the EM may be sized to meet the desired EV driving performance requirements of the vehicle. This may mean that the EM torque equal to or greater than the conventional ICE torque used in that vehicle application. The ICE may be sized to meet average power required to maintain maximum average vehicle speed for the intended vehicle application. For merely one example, an "on highway" passenger vehicle would desire enough power to maintain the posted speed limit up an infinitely long, moderately sloped road (between 3% and 6% grade). In this embodiment, this may mean that the ICE may be smaller than needed in conventional vehicles and thus may be more efficient under the management methods described herein. In other embodiments, it may possible to design the vehicle to meet peak power requirements for certain maneuvers. Such vehicles may have a different energy efficiency profile than the one just mentioned.

In several alternative embodiments, the transmission may be of any variety allowing ratio changes: discrete manual, dual clutch automated, planetary automatic, belt type CVT, chain type CVT, or other types of mechanical CVTs, electronic transmission etc. If the transmission is an automatic type traditionally coupled with a torque converter device, said device may be eliminated and/or optionally replaced by a dry clutch in the position of C2. Also, if the transmission is of automatic type, the vehicle clutch pedal may be omitted. If the transmission is a CVT, C2 may be omitted all together or relocated between the CVT and drive axle. Transmission sizing and ratios may be chosen in concert with the final drive ratio (e.g., in the axle) to optimize the speed of the EM and the ICE during the highest vehicle operating speed. Optimize in this case may mean affecting the lowest RPM possible while still meeting power requirements for that vehicle speed and still maintaining minimum idle speed of the ICE. The Torque vs. Speed performance data for the EM and ICE may be available and referenced for this optimization.

With these sizing/selection rules, many variants for many applications and GVWR can be achieved with optimal performance. To support some non-limiting examples and embodiments, there may be several key principles to consider:

(1) The ICE may be as small as the application allows. This may be based on average power requirements of the vehicle duty cycle.

(2) The EM may be of equal or greater power than the ICE to allow for full Electric drive mode. It may be desirable that the vehicle performance be nearly identical in EV drive mode and hybrid mode, thus there may be no need for oversized EM power.

(3) EM torque may be greater than the ICE torque at any given speed because this torque can be used in both parallel and EV mode to improve vehicle performance.

In one embodiment, the EM may be a through-shaft design, capable of transmitting the greater of maximum torque from either the ICE or the EM, but at maximum—the greatest combined torque from the ICE and the EM at any given speed point. The torque capacity of the EM through-shaft affects the available vehicle performance in hybrid mode but not EV mode. In another embodiment, the through shaft may mechanically couple to a clutch plate on one side of the EM and a flywheel on the other side. Such a flywheel may be of minimal mass and may provide a friction surface for a second clutch. This design may require the EM shaft and bearings to handle an axial load imposed by one of the clutches during the decoupled state.

In one embodiment, the EM shaft, ICE crankshaft and transmission input shaft may have similar peak speed capability. This would tend to ensure similar performance in EV and HEV mode. The transmission input shaft may be capable of handling the peak speed of the EM and ICE; otherwise, the full power of either EM or ICE may or may not be usable—e.g., possibly due to other vehicle components, such as transmission, axle gear, vehicle axle or tire limits. The lowest peak speed capability of any one component in the chain of components limits the operation of all other components in the chain. In another embodiment, C1 may be sized to handle the full torque and speed of the ICE. C2 may be sized to handle the same torque and speed as the EM through-shaft is designed for.

Control Algorithm Embodiments:

In one embodiment, the power train control algorithm may comprise multiple modes of operation. For example, the powertrain may comprise of the following modes: (1) EV drive mode; (2) Parallel Hybrid mode; and (3) conventional combustion (ICE) mode (used for limp home operation only). In addition, a 4th mode may be implemented known as "Standing Recharge". In this mode, the ICE is used to power the EM as a generator. "Recharge" means generating electric energy by the power of the ICE. Standing Recharge may be used with this powertrain architecture to either recharge the batteries or provide export power—e.g., when the vehicle is stopped.

In one embodiment, with the inclusion of C2 or other decoupling devices within the transmission, such a "Standing recharge" may be affected. In this mode, it may be possible to allow an "Export Power" feature. Thus, in "Standing Recharge" mode, it may be possible to have the ICE running to generate electric power with the EM while the vehicle is at zero vehicle speed and the EM is disconnected from the wheels. Export power inverters are available off the shelf and may add to the vehicle.

EV Drive Mode—in one embodiment, the EM torque may be linked to the demand of the driver, as requested by the accelerator pedal (APP). During this mode, C1 is always open and the ICE is always off. The opening of C2 may be controlled directly by the driver actuated clutch pedal. If a 'clutch by wire' setup is used, the PCU may either open C2 or control EM torque to simulate the feel of clutch slip while keeping C2 closed. This clutch by wire setup would tend to reduce wear on the clutch—e.g., because less time may be spent slipping the clutch. The effect achieved by desired control of EM torque may give the driver a consistent experience across all modes using the clutch pedal—whether C2 was actually opened or not—and duplicate the experience had with clutch operation in a conventional ICE-powered manual transmission (MT) vehicle. C2 may still occasionally be opened such as in particular cases during operation of Parallel mode or Conventional mode to prevent the ICE from stalling or other conditions—e.g., such as undesirable vibrations etc.

Parallel Hybrid (HEV) Mode—in one embodiment, the power supplied to the wheels may be a blend of power from the EM and the ICE. In this mode, one rule may be that the ICE supplies only enough torque to meet the average power demand. In one embodiment, the ICE torque may never be above the ideal operating line (IOL) for that particular ICE. This IOL specifies the most efficient torque for a given speed. At any given instant, partial torque—not supplied by the ICE but demanded by the driver through the APP—may be supplied by the EM. This tends to reduce the transient load on the ICE. This means the EM can be providing negative or positive torque at any instant. When the EM provides negative torque, it recharges the High Voltage (HV) battery. When it provides positive torque it discharges the HV battery. With either of these two actions, the HV battery SOC is affected. The estimation of "average demanded power" is happening constantly and is averaged over a period of only a few seconds. This time period, over which power may be averaged, may be adjusted based on the variance and peak values of the accelerator pedal over that time period.

Conventional Combustion (CC or ICE) Mode—CC mode may affect a "fall back" or "limp" mode in which C1 is closed and the full torque demand is supplied by the ICE. In one embodiment, the ICE may never stop spinning in this mode. This mode may imitate the conventional vehicle—e.g., as if the EM was not present. This mode may have diminished performance over a conventional combustion vehicle—e.g., if the ICE has been downsized for better fuel economy when battery power is available. In another embodiment, this vehicle may operate and perform as its conventional counterpart during CC mode. In some embodiments, this mode may be engaged when the SOC of the HV Battery is so low that discharging the battery for any duration may be detrimental or if the HV system itself has a fault requiring shutdown of the HV system. During vehicle stops, the ICE may be kept at idle and the driver may command C2 to be opened. If C2 is not opened, the PCU may open C1 automatically to prevent ICE stall at extremely low vehicle speed. The launch of the vehicle in this mode may affect slipping of C2 which may be controlled by the driver clutch pedal as in a conventional ICE powered MT vehicle.

Power Blending Embodiments

In many embodiments, the power blend may change dynamically as SOC changes. In order to maintain a minimum SOC while meeting the performance demands of the driver, a target "operating" minimum and maximum SOC may be selected (e.g., automatically by the controller and indicated to the driver by the interface) at which the SOC may oscillate between during HEV driving. As the SOC nears the operating minimum, the recharge power may be greater. As the SOC nears the operating maximum, the recharge power may be less. Through calibrated parameters (that may dependent on vehicle behavior and driver inputs), the power blend algorithm may change its power demands from the EM and ICE, as the SOC changes. These parameters may also take into account environmental factors such as ambient temperature, air pressure, altitude, road grade, etc. For one example, the system may use more positive EM torque near the operating maximum SOC and more EM negative torque near the operating minimum SOC. The goal of this power blend algorithm is to limit recharge but also limit transient demands on the ICE. It is known that using the ICE power to recharge the HV Battery may be inefficient when the complete recharge and discharge cycle is taken into account. But this effect may be balanced against the effect of operating the ICE far from its IOL. The algorithm may be designed to select the most efficient way to operate between the choice of throttled ICE operation or recharge of the battery with excess ICE power. The Torque vs. Speed Efficiency plots for the EM and ICE may be available and referenced for optimization of this algorithm.

In other embodiments, it may be desirable to consider other factors in the power blend algorithm. For example, peak recharge power may be limited to prevent accelerated wear and deterioration of the HV battery. Such a limit may vary battery to battery because of chemistry—but may be proportional to battery capacity.

In another embodiment, the recommended mode change and shift policies may be designed to maximize the use of off-board electric energy or minimize the use of off board carbon fuel. Such algorithms may include information from the driver on the destination of the vehicle and the available electric charging stations and other manners of information to allow the collection of electric energy. The cost of the various fuel sources as inputted by the driver or other sources may be a factor in the decision by the controller.

Clutch Actuation Embodiments

In many embodiments, clutches C1 and C2 may be opened and/or closed to affect many of the various modes of operation of the HEV and/or PHEV. For example, C1 may be opened when desired, e.g., such as when transmission input speeds—as may be determined by vehicle speed and/or selected gear ratio—fall below the idle speed of the ICE. This may prevent the stall of the ICE. In addition, C1 may also be opened during vehicle deceleration to allow for more regenerative braking power. C1 may also be opened when the vehicle decelerates below a certain vehicle speed—e.g., in anticipation of a vehicle stop. Depending on SOC, the ICE may be turned off or kept running for a certain amount of time while the vehicle is stopped. The controller may decide this based on recent past driving conditions and which may be best for near future energy efficiency.

Vehicle launch while in HEV mode, from a stop, may be done several ways. For example, EV launch may be implemented with the EM torque following the accelerator pedal—and C2 position following the clutch pedal. C2 may or may not be slipped during this event depending on driver input. This method may duplicate the launch experience had with the clutch operation in a conventional ICE-powered MT vehicle. C1 may be opened during this event.

In another example, EV launch may be implemented with EM torque a calculated result of the accelerator pedal and clutch pedal inputs but with C2 closed. In such a case, there may be no slipping of C2. C1 may be open during this event. This may be possible because the EM may tend to have a high stall torque and doesn't require idle speed—thus, it may be left at zero RPM until the instance torque is demanded.

In yet another example, Hybrid launch may be affected by having the ICE spinning at or above idle. C1 may be closed during this event. This mode may be used at low SOC conditions to conserve HV battery energy. The EM may (but is not required to) provide supplemental torque during this event. The ICE may follow the torque demand of the APP with a computer controlled or separate idle governor operating to prevent ICE stall. This launch may be possible if the ICE is kept at idle when the vehicle is stopped. Either C1, C2 or both may be open to affect this. In one embodiment, all three aforementioned ways may be implemented and dynamically chosen based on the current vehicle and/or driving conditions.

During both EV and HEV mode, Regeneration Torque (Regen) can be applied by the EM. This differs from recharge power implemented by the power blend algorithm in HEV mode. During Regen, the ICE torque output is zero and the vehicle is decelerated as a result of the Regen. Thus Regen is really the act of converting the vehicle's kinetic energy into electrical energy. Regen is not a new idea but the implementation and amplitude control is. This algorithm may take into consideration the interaction with the discrete manual transmission and the overlay of the friction brakes.

The Regen algorithm may seek to balance driver feel with maximum energy recover over the complete driving cycle. It may be desirable to implement this in addition to FMVSS certified friction brakes, actuated hydraulically. In one embodiment, it may be possible to program some amount of Regen to be applied when no pedal is pressed. This is called "neutral regen." In another embodiment, it may be possible to make the first small amount (10-20%) of travel on the APP to control the amount of Regen applied. This may lead to the practice of "one foot" or "one pedal" driving. In yet another embodiment, it may be possible to have zero neutral regen but design the brake pedal to demand the regen torque before actuating the hydraulic brake. This may be desirable as it may allow greater amounts of regen torque to be safely commanded. It may tend to decelerate the vehicle when expressly commanded by the driver and thus requires no driver education to operate optimally.

At some point while Regen is applied, it may be more efficient to turn off the ICE to conserve fuel. At high SOC, this means C1 is immediately opened and then the ICE is turned off. At low SOC, C1 can quickly open but the ICE may remain running for a brief period of time in case it is needed to immediately contribute positive torque. This time to keep the ICE running may vary with SOC, vehicle speed and recent driving conditions. This algorithm of ICE shutoff during deceleration will be refined in vehicle testing. It should be noted that not every instance of vehicle deceleration benefits from C1 open. When SOC is very low, it may be advantageous to command large negative torque from the EM while commanding some positive torque from the ICE. This would be a simultaneous recharge and regen event.

It may be desirable to apply Regen to improve drivability. It may be desired to maintain a consistent braking feel while regen is applied at a particular vehicle speed, regardless of current gear ratio. A special consideration to regen torque transferred through a multi-speed transmission to achieve this consistency may be the resultant force at the wheels. To compensate for this, commanded regen torque may have a factor applied based on what gear ratio the transmission is currently in. This may result in a similar brake force at the wheels, for a given speed, before and after a gear change. The Regen torque at the wheels may be also limited by the controller based on vehicle speed. This may artificially limit overall regen at the wheels at low vehicle speeds for better drivability.

Another method of implementing the regen limits may be to use separate EM regen torque limit tables for each gear ratio. EM speed may be an input and maximum allowable regen torque may be an output of each table. Of course, the controller may take into account additional factors to limit regen power to protect drive components; including, but not limited to: maximum allowed recharge current (e.g., as determined by the BMS) or torque available determined by the EM controller.

One Control Algorithm Embodiment

Figure 2:
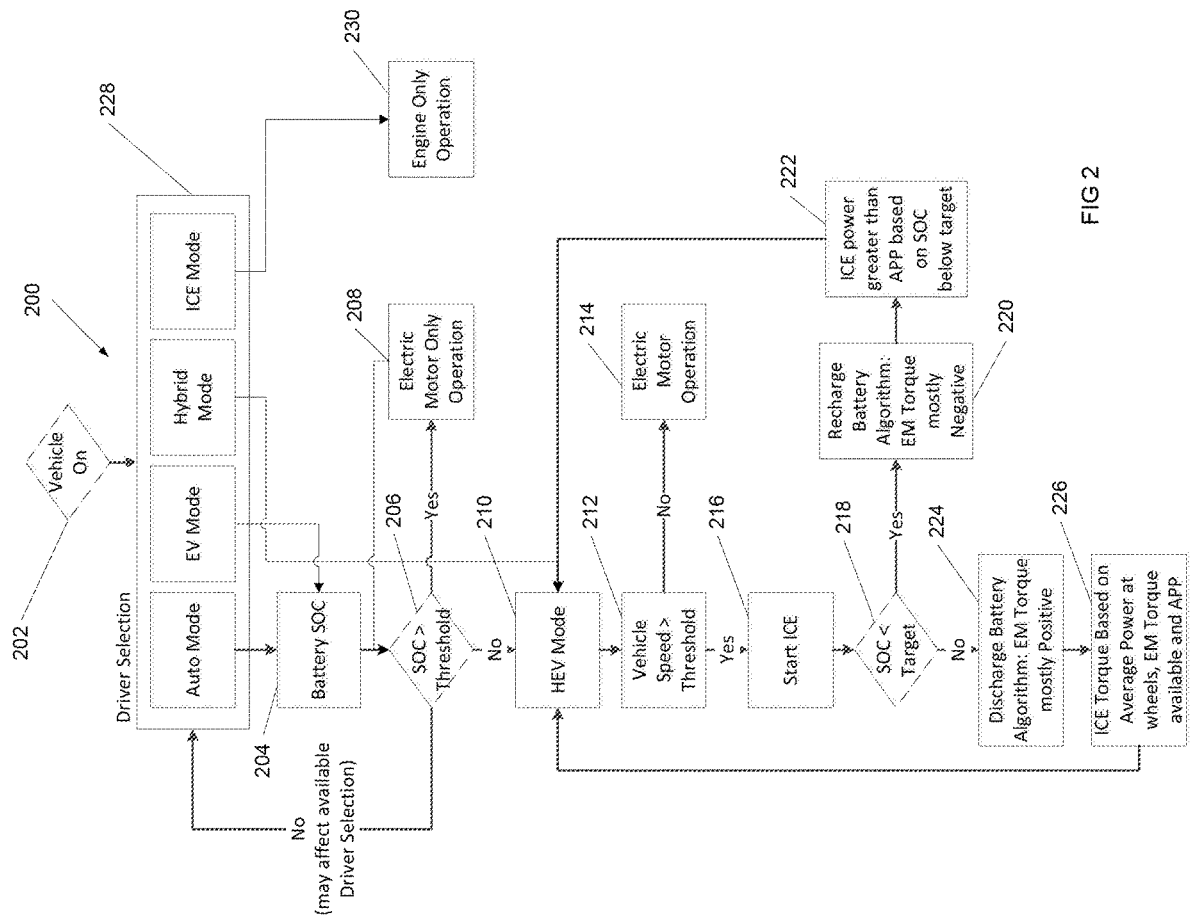
FIG. 2 shows one possible embodiment of a control algorithm for control of various embodiments of powertrains for HEVs and PHEVs, as made according to the principles of the present application.

Attention is now directed to FIG. 2. FIG. 2 is merely one control algorithm 200 that may affect desired control of the HEV and/or PHEV, as desired. In this embodiment, the vehicle may be turned on at 202. Optional driver selection 228 may be input—e.g., the driver may select one from among a number of possible drive modes (e.g., auto mode, EV mode, hybrid mode and ICE mode). If the driver selects ICE mode, then the algorithm may move into Engine Only Operation mode 230. If the driver selects auto mode or EV mode, then the algorithm moves to step 204 and the controller may determine the battery State of Charge (SOC) at 204. If the SOC is greater than some desired threshold at 206, then the vehicle may be operated in Electric Only mode at 208. If the SOC falls below a desired threshold at 206 (or at a later time while in Electric Only mode), then the vehicle may affect HEV mode at 210.

While in HEV mode (which may be entered into automatically or by driver selection at 228), the controller may assess the speed of the vehicle. If the speed of the vehicle is less than a desired threshold, then the vehicle may transition to an Electric motor operation at 214. One possible difference between modes 208 and 214 may be the exit condition. Both modes may entail the Electric motor providing all traction power to move the vehicle. For Electric Only mode at 208, the controller may transition back to 206 and on to HEV mode when the SOC falls below the threshold. For Electric motor operation at 214, the controller may transition back to 212 and then start the ICE when the vehicle speed passes the threshold. In this way, Electric only operation at 208 may happen for a range of vehicle speeds and SOC. By comparison, electric motor operation at 214 may be more of a brief state until the vehicle gets to a certain speed threshold at which the ICE is started and power blend can occur.

If the vehicle speed is greater than a desired threshold, then the controller may start the ICE at 216. During operation, if the SOC falls below a desired target, then the controller may affect a "Recharge Battery" algorithm at 220 (e.g., in which the EM torque may be mostly negative). The ICE power may be placed greater than APP at 222—based on HV battery's SOC and its distance below a desired target.

If, however, the SOC is not less than a desired target, then the controller may affect a "Discharge Battery" algorithm (e.g., in which the EM torque is mostly positive) at 224. The ICE torque commanded at 226 may be based on the average power at the wheels, the EM torque available and the current APP. Other factors may affect the ICE torque commanded as well—e.g., such as environmental conditions (e.g., ambient temperature, air pressure), vehicle conditions (e.g., engine temperature) and recent driving conditions (e.g., variance in the APP history, estimated road slope).

In some embodiments, the target SOC may be a special threshold that not only determines whether the controller is in Recharge or Discharge Battery algorithm, but may also determine the degree upon which those algorithms affect their purpose. As the SOC moves further from the target, the appropriate algorithm may demand greater Recharge power or Discharge Power to bring the SOC back towards the target. In this way, the SOC may oscillate around the target while in HEV mode.

In some embodiments, the target may not be strictly static. The target may have a default value for normal vehicle operation—but may be altered by either the controller itself to react to driving conditions or by driver input. In this way, the target may adapt to the demands of the driver while optimizing the HEV mode efficiency. The controller may determine the desirability for a higher target SOC to allow for greater oscillations in the SOC around that target.

One method to determine this desirability may be to compare the history of the powertrain load to the history of the vehicle speed. When the vehicle is heavily loaded and/or driving on hilly terrain, the powertrain load may be higher than a pre-calculated average for each speed. This may indicate a desirability for larger SOC oscillation to accommodate transient loads in the EM operation.

Another method to determine if and when the SOC target should be raised, may be to create a database of map coordinates with corresponding target SOC. The vehicle may be equipped with GPS device and feed the current location to the controller. The controller may then reference this location to areas of known terrain that benefit from higher SOC swings and thus higher SOC target.

Another method to raise or determine the SOC target may be driver input. This may be implemented in several ways; the driver can input directly a target percentage or the driver can indicate a reserve amount of SOC to maintain. This driver-determined SOC target may be desirable, as the driver may "reserve" electric power for future operation. For example, if the driver wishes to operate on the highway in HEV mode such that when arriving in a residential neighborhood the vehicle may run in EV only mode. Or when arriving at a destination the driver may wish to use the stored electric energy in the HV battery as "export power" for off board use. These driver selections may be made through a suitable interface—e.g., employing either physical switch setting or soft switch setting on an LCD display screen, or by any other known user interface.

Figure 3:
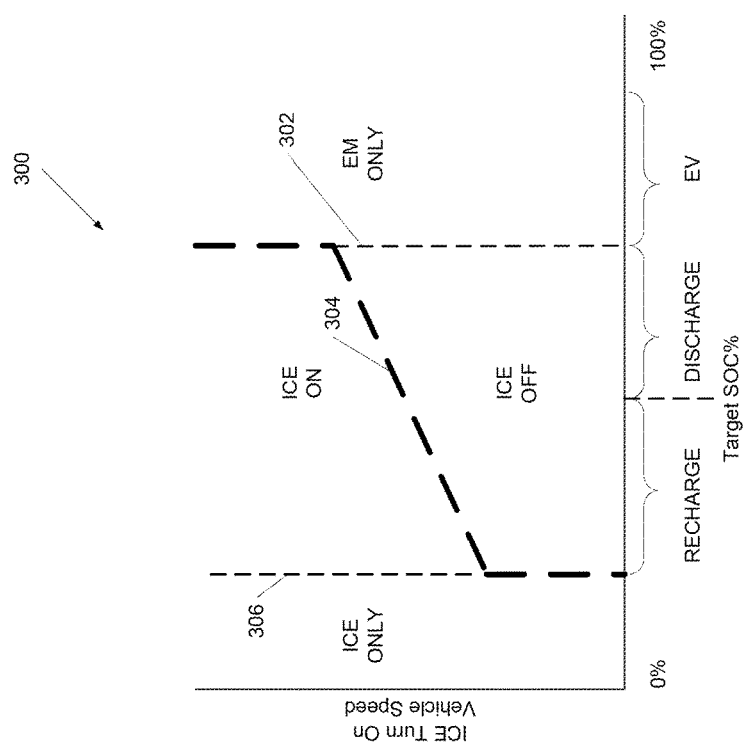
FIG. 3 is one embodiment of a control methodology for transitioning between driving modes.

Although there are many different embodiments for affecting the desired threshold as described herein, FIG. 3 depicts merely one such embodiment. Graph 300 plots ICE turn ON/OFF regions as may be depicted in vehicle speed versus SOC space. For example, line 302 may demark a point of SOC at which (or above), the powertrain might operate in an EM ONLY mode (i.e., the EM is ON/ICE is OFF for the entire driving time).

At SOC between line 306 and 302, there may be a line 304 at which the ICE is ON at vehicle speeds above the line 304 at a given SOC. Alternatively, at vehicle speeds lower than the line 304 at a given SOC, the ICE may be OFF. It will be noted that the line 304 may assume a non-zero slope—and the ICE may turn ON at lower vehicle speeds and lower SOC points. In other embodiments, there may be time and space diagrams that have more than one threshold points and/or lines—e.g., in order to avoid a thrash mode or cycling between modes of operation at or near threshold line 304.

At some desired HV battery SOC level, it may be desirable to affect an ICE ONLY mode. This SOC level may be 0% useful charge remaining in the battery—or some desired amount greater than 0% useful.

In addition, FIG. 3 depicts that there may be a Target SOC point above which the powertrain is primarily in "Discharge" mode (i.e., the powertrain may seek to maximize opportunities in the drive cycle to substantially use electrical energy (via the EM) as a prime mover of the HEV/PHEV). Alternatively, at points below the Target SOC, the powertrain may be primarily in the "Recharge" mode (i.e., the powertrain may seek to maximize opportunities in the drive cycle to use gasoline energy (via the ICE) to recharge the battery—as well as substantially being the prime mover of the HEV/PHEV.

Figure 4:
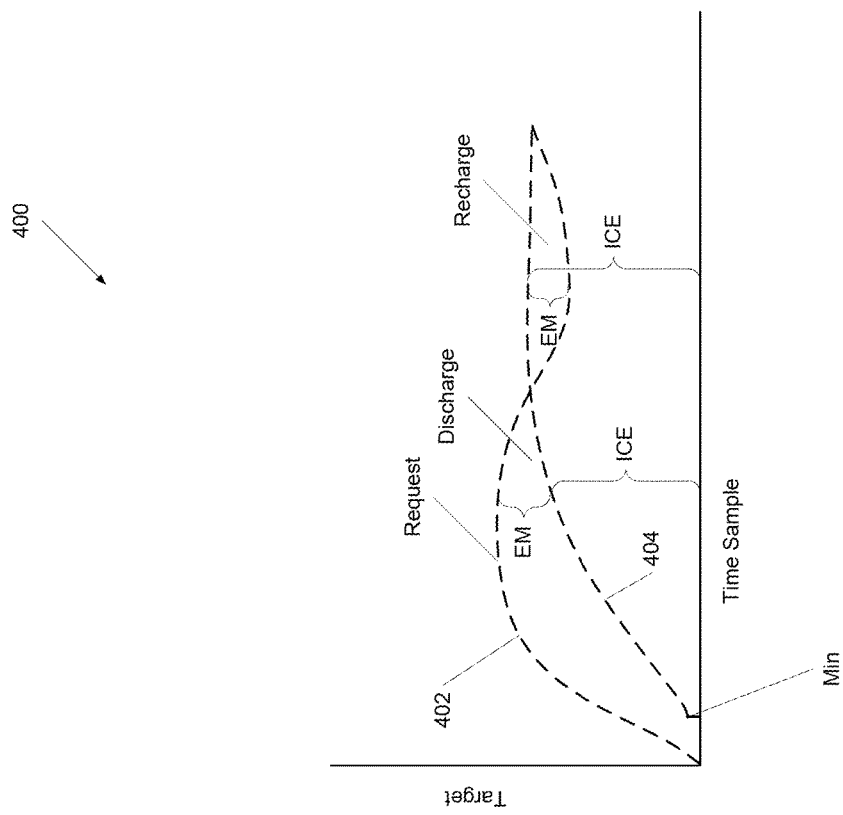
FIG. 4 depicts one exemplary graph of the possible dynamic behavior for mode transitions.

FIG. 4 depicts one exemplary drive cycle and one possible operation of a powertrain made in accordance with the principles of the present application. Graph 400 depicts one drive cycle, occurring over a time period. Curve 402 represents the power demanded by a driver of the vehicle over time and curve 404 represents the power supplied by the ICE in this putative drive cycle. As may be seen, at points to the left of the intersection of curves 402 and 404, the powertrain may be operating in a Discharge mode. In this case, it is seen that the EM may utilize electrical energy out of the battery to satisfy the power demanded by the driver—together with power coming from the ICE.

At points to the right of the intersection of curves 402 and 404, the powertrain may be operating in a Recharge mode. In this case, the powertrain may seek to place electrical energy back into the battery—e.g., even to the extent of splitting the power from the ICE between driving the wheels and placing electrical energy back into the battery.

For example, the controller may use the algorithm in FIG. 2 to determine when to be in Recharge mode. Recharge mode may be desired, as is Discharge mode, to keep the SOC oscillating around the Target SOC in HEV mode. HEV mode may achieve greater efficiency over an entire drive cycle compared to a conventional ICE vehicle because more ICE operating points occur at a higher efficiency region during HEV operation. This tends to offset the electrical losses of the electric drive components during recharge and discharge. Additionally, Recharge mode may be initiated by a change in the SOC target as discussed above Embodiments Involving Transition Between Modes:

There will now be discussed several embodiments of how a powertrain made in accordance with the principles of the present application may transition between the various modes, as described herein.

ICE Start Up: When it is desired to get power from the ICE but the ICE is not running, the powertrain may start the ICE using the torque of the EM, aka "bump start." This may be done when C2 is open, e.g., such as during a driver actuated shifting event or when the vehicle is stopped. The C1 clutch may or may not be slipped briefly while the EM is in motion to start the ICE turning. In one embodiment, C2 is open to prevent the vehicle occupants from feeling the inertial torque from the ICE start up.

In an alternative embodiment, "bump start" of the ICE may occur when C2 is closed. In this case, the EM torque may be controlled to compensate for the ICE inertial torque during the bump start event. Thus, the ICE may be started with the EM—e.g., as long as the total powertrain torque demand does not exceed the capacity of the EM after subtracting the necessary inertia compensation torque. The EM torque may be reduced quickly as the ICE torque ramps up so that the vehicle acceleration due to total powertrain torque before, during and after the bump start event remains proportional to driver APP demand.

Several variants of "Stop-Start" ICE technology may allow the ICE to start itself without torque from the EM or even a 12-volt starter motor. In one embodiment, a hybrid powertrain may benefit from the implementation of such "stop-start" ICE technologies. One such system may have the ICE stopped on a compression stroke and the valve train may be capable of holding the compression for until the ICE must restart itself. This embodiment may not be preferred if the ICE is off for long periods of time, because compression may be lost overtime, but is applicable to this powertrain architecture in some cases. If the EM is going to be used for "bump start," the traditional 12 volt starter may still be installed in the vehicle for rare and/or special situations where the EM cannot provide the "bump start" torque.

Another possible condition for "bump" starting the ICE may be to start the ICE if the power demand is negative, or zero. Such conditions may exist when the vehicle is decelerating or if the transmission is in neutral during a shift from one gear ratio to another. By starting the ICE engine in these times, the engine start may be seamless to the passengers of the vehicle and may use little or no energy from on-board stored sources.

Transition from EV mode to HEV mode: This transition may occur under at least two circumstances. In one case, the PCU may affect it when the SOC of the HV battery falls below a given threshold (e.g. an "operating maximum"), as desired in the HEV algorithm. In another case, the driver may request hybrid mode operation, prematurely, by selecting it on the Dash Display (if such a selection is allowed to the driver by the software under current operating conditions). This may be desirable for a variety of reasons—including, e.g., the desire to save EV range for the final few miles of the trip, or the desire to use zero idle export power in the future which may desire that a higher SOC be maintained, or even the knowledge that mountainous terrain is ahead (or any other suitable drive cycle condition). Regardless, when the transition conditions are met, the PCU may allow the ICE to turn on at opportune times to power blend with the EM—thus conserving energy and at times replenishing the SOC level.

Transition from HEV mode to EV mode: This transition may occur when the SOC has gone above the HEV "operating maximum." For example, if the vehicle is driving in a long downhill decent (or some other condition) where the vehicle has recovered enough energy through regen braking to move the SOC above the operating maximum or other desired threshold.

In another example, this transition may also occur if the driver requests EV mode, by selecting it on the Dash Display (if allowed), after driving in the aforementioned prematurely requested HEV mode. This might happen if the driver is nearing the end of the trip and wishes to use the EV range he/she was conserving in the first place. The event may involve the shift of all traction torque to the EM. In this case, C1 may be opened and the ICE may be turned off. To smooth this trade-off of power, the transition may be prevented if the driver was requesting over 80% APP (this value to be adjusted after in vehicle testing). Once the APP is below 80%, the transition would occur assuming all other necessary conditions are still present.

From EV or HEV to CC: As described herein, CC or ICE Control Only mode may be a fall back mode—e.g., initiated (e.g., by the driver or controller) if for any reason the EM may not be able to provide its requested power. This could be caused by many reasons—including, e.g., a fault with one of several High Voltage components. Regardless of why, the transition may desire that the ICE to be started (if not already running) and all driver demanded torque to be provided by the ICE. C1 may be closed as soon as C2 is opened (e.g., by the driver). Once closed, C1 may be left closed as long as the vehicle is in CC mode. The EM may be disabled (if not already) and the power blend algorithm may request zero torque from the EM. The driver may be notified of this mode with a light and message on the Dash Display. The Dash Display may also inform the driver to open C2—e.g., so that the ICE may be engaged. A complete vehicle shutdown may be desired to exit this mode. If the vehicle is turned back on and the fault condition is still present, the driver may be notified and may use the key to request an ICE crank by the 12 volt starter. In addition, the brake may be pressed and C2 may be opened by the driver before the ICE may be allowed to crank. In this mode, the vehicle may revert to a conventional manual, automatic or CVT vehicle.

Embodiments for Shift Recommendation

It will now be discussed several embodiments for recommending a shift of gears in the transmission. Such recommendations may be made to the driver (e.g., if the HEV/PHEV is a manual transmission or there is some degree of freedom for the driver to order a shift)—or, alternatively, the recommendation may be made to the controller (e.g., by the controller or other controllers on board which may control an automatic discrete gear transmission or CVT).

Figure 5:
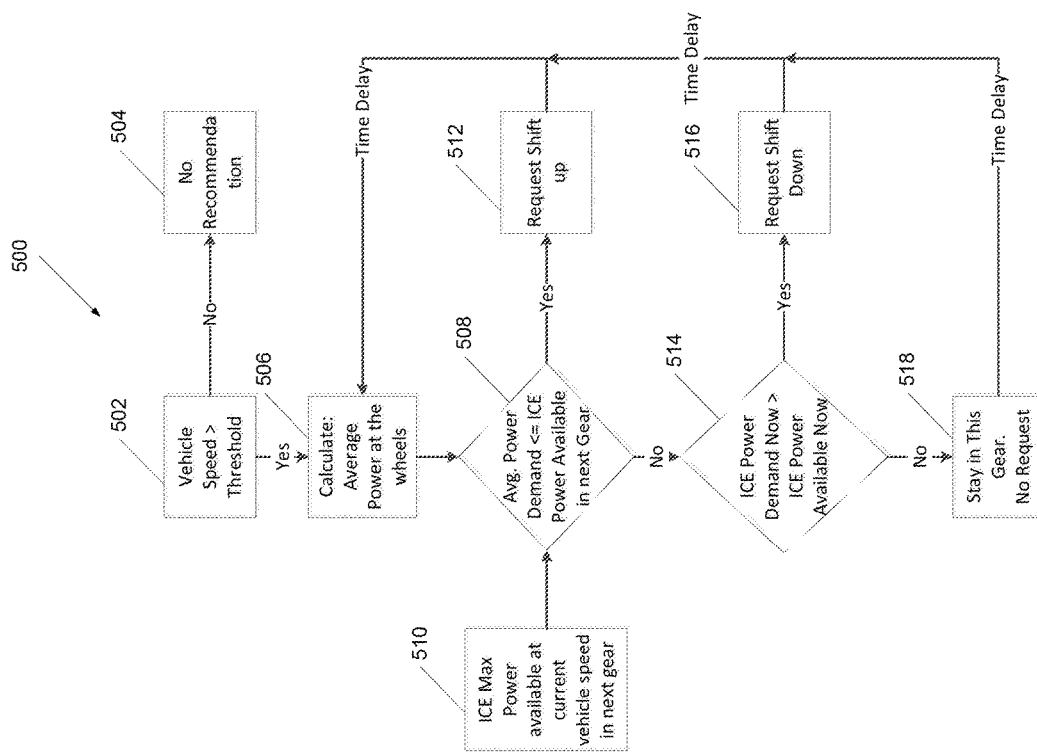
FIG. 5 is one possible embodiment of a method for recommending a shifting for the transmission in a HEV and/or PHEV as made in accordance with the principles of the present application.

FIG. 5 depicts merely one embodiment of an algorithm 500 that may recommend a shift (or otherwise a change in gearing of the transmission). At 502, the system may detect or otherwise determine whether the speed of the vehicle is greater than some desired threshold. If not, then the system may not produce any recommendation for shifting at 504.

If the speed of the vehicle is greater than some threshold, then the system may calculate the average power at the wheels of the vehicle at 506. If the average power demand is less than (or, alternatively, less than or equal) than the ICE power may provide in some suitable other gear (at 508)—and if the ICE max power is available at the current vehicle speed in that suitable other gear (at 510), then the system may recommend/request (at 512) to shift to that suitable other gear.

If, however, the ICE max power is not available (for whatever reason), then the system may assess whether the ICE power demand now is greater than the ICE power available now (at 514). If so, then the system may recommend/request a shift to a suitable gear (e.g., down). If not, then the system may make no recommendation/request to changes gears (at 518).

In one embodiment, the algorithm may be constantly running and looping back to 506. It may be attempting to determine the highest gear ratio acceptable to meet the driver's demands. In this way, the Shift Recommendation algorithm tries to allow the average power demand to be met by the ICE while minimizing the ICE speed. This may be desirable for HEV mode. But ICE power may not be relevant in EM only mode. The shift recommendation algorithm may have more than one operating mode itself in order to remain accurate to the energy sources being used by the powertrain at the time. For EM only mode, the shift recommendation algorithm may follow the flow in FIG. 5 but may look at EM power parameters (e.g., max power, demanded power and available power) instead of similar ICE power parameters. An additional consideration step may be added before 512 to compare EM efficiency now vs. EM efficiency in next gear higher or lower because EM efficiency may not be maximized at its lowest speed and therefore its efficiency map may be considered at each operating point. With this added EM efficiency comparison step for EM only mode, recommended upshift may occur at later vehicle speeds (than would occur in HEV mode) to operate the EM at its most efficient point.

Gear shift recommendation may be a calculation that is constantly running. When a discrete manual transmission is used in the architecture, the resultant ratio may be a recommendation conveyed to the driver through various methods. In one example, the recommendation may be communicated as a desired action to shift up or down and may be relative to the current gear selected. This recommendation may be made by auditory, visual or other measurable sensor cues such as a visible light turning on or changing color, a particular sound playing, etc.

In one example, the conventional Instrument Panel Cluster may be implemented in the vehicle with the addition of a small "shift request" light. This light, preferably a daylight visible Yellow LED, turns on to indicate the driver should upshift to the next gear. The light may remain on as long as the gear ratio recommendation algorithm calculates they should. The light may be made to flash if the algorithm calculates the driver should downshift. The flash/no flash/coded flash mode may have many variations to convey the proper information to the driver.

In another example of indicating a relative shift action, an LCD screen is installed in the vehicle dash. When the shift recommendation determines a change in gear ratio is desired, graphics on the display may move, change color, shape, size or even new graphics may appear. Symbols such as arrows may also appear or change on the display to indicate a desired shift action.

In another example, the recommendation may be a recommendation made with the number of the gear ratio desired to be selected. These too may be conveyed to the driver by auditory, visual or other measurable sensor cues but may also be numeric in nature, e.g., displaying the desired number somewhere within the visual range of the driver, a sound saying the exact number to the driver in his chosen language, etc. In another example, gear ratio recommendation may be incorporated into existing gauges such as the speedometer with colored or patterned bands around the outer circumference, each particular color or band representing an ideal gear at a particular speed range. These bands may be passive or actively adjusted by the software while driving to account for vehicle conditions and driver behavior.

When an automatic transmission or CVT is used, the resultant gear ratio recommendation may be fed to that transmission controller to optimize the drivetrains system efficiency automatically. Display of this information may be optional for additional driver information.

Some Vehicle Features Embodiments

The following is a list of various alternative embodiments for possible powertrains made in accordance with the principles with the present application.

Dual 12 volt sources, a DC-DC recharges the 12 volt system from the High Voltage system and a mechanical powered alternator can also recharge the 12 volt system when the ICE is turning.

hill decent or accent estimation based on powertrain loads and vehicle speed derivative. This calculation may be done by the controller using recent powertrain feedback and/or GPS data. The value of vehicle acceleration and current road angle will be fed to the regen torque algorithm and the power blend algorithm to not only improve driver feel with consistency but also improve efficiency by taking advantage of kinetic energy recovery going downhill (e.g., regen braking) and increased ICE power when going uphill and may raise the Target SOC.

neutral switch within the transmission and current gear ratio sensing are important feedback signals to the mode selector algorithm and the power blend algorithm to trigger events with minimal driver disturbance. Such events as bump start of the ICE, transition to HEV from EV mode. Also, current ratio will help the power blend and regen torque algorithms operate more efficiently. Implementation of a current gear ratio estimator will be used in absence of an actual feedback of current gear ratio. This estimation can be very accurate in steady state operation but lags behind real time changes—e.g., by less than one second.

Dash display will provide powertrain information pertinent to optimal operation of the hybrid vehicle. Data displayed such as SOC remaining, trip energy consumption, current hybrid mode (e.g. EV, HEV, Regen active, CC), recommended gear ratio (if applicable), Warnings and Faults, battery temperature, etc. may all be displayed in various LCD screen modes. In addition to displaying information, the dash display allows the driver to request basic modes such as EV, HEV or even CC.

Simplified Clutch Embodiment

FIG. 6 depicts one embodiment of a simplified, hybrid clutch pack assembly 600 that may suffice in many of the powertrain embodiments disclosed herein. Clutch assembly 600 may comprise a first clutch 608 that functions to clutch in the ICE 602 to the shaft. Clutch 606 may function to clutch in the EM 604 to the shaft.

This hybrid clutch pack may be integrated into the primary PHEV powertrain to couple the engine, the electric motor and the transmission and/or a second electric motor. The clutch pack may exist as a single unit that will be used to couple/de-couple the engine and or electric motor systems to/from the transmission/second electric motor input shaft. Clutch 1 (608) may be used to slip start the engine and transmit the torque of the engine into the powertrain. Clutch 2 (606) may be used to couple the drive system (engine and electric motor) to the input shaft of the transmission/second electric motor. Both clutches may be operated in the open position at moderate to high differential speeds for extended periods. The clutches must have minimal losses when operating in the open position. The clutches may be either wet or dry type, depending on consideration for heat energy management. It may be possible to control both clutches with respect to the torque transmitted. The actuation unit may interface with the vehicle control system. In some embodiments, the actuation unit can be separate and remote from the clutch pack itself.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A powertrain for HEV/PHEV vehicles, said powertrain comprising:
   a single prime mover;
   a single electric motor-generator, said single electric motor-generator comprising a through-shaft and being mechanically coupled to said single prime mover via a first clutch on said through-shaft;
   a transmission, said transmission mechanically coupled to said single electric motor-generator via a second clutch on said through-shaft, wherein engagement of the first clutch and the second clutch couples the single prime mover with the transmission and disengagement of the second clutch decouples the single prime mover and the single electric motor-generator from the transmission;
   a battery, said battery electrically coupled to said single electric motor-generator, said battery supplying electrical energy to said single electric motor-generator; and
   a controller, said controller configured to supply control signals to said single prime mover, said first clutch, said single electric motor-generator, said second clutch and said transmission such that said controller is configured to dynamically affect a plurality of powertrain operating modes; wherein further:
   the first clutch and the second clutch are configured as a clutch pack positioned between the single electric motor-generator and the transmission, wherein the clutch pack comprises a single unit; and
   the through-shaft is configured to deliver a combination of torque to the transmission from the single prime mover and the single electric motor-generator.

2. The powertrain of claim 1, wherein said plurality of powertrain operating modes is selected from a group comprising: auto mode, electric vehicle (EV) mode, parallel hybrid mode, standing recharge mode and internal combustion engine (ICE) mode.

3. The powertrain of claim 1 wherein said powertrain further comprises a driver interface, said driver interface capable of receiving driver selection of a powertrain operating mode.

4. The powertrain of claim 1 wherein said transmission comprises one of a group, said group comprising: manual transmission, automatic transmission, continuously variable transmission (CVT), discrete manual transmission, dual clutch automated transmission, planetary automatic transmission, electronic transmission.

5. The powertrain of claim 1 wherein said single prime mover comprises one of a group, said group comprising: an ICE engine, a fuel cell, and hydrogen engine.

6. The powertrain of claim 1 wherein said through-shaft is configured to deliver a maximum combined torque from the single prime mover and the single electric motor-generator at any given speed point.

7. The powertrain of claim 1, wherein the plurality of powertrain operating modes includes a standing recharge mode, wherein in the standing recharge mode the first clutch is engaged and the second clutch is disengaged, to cause the single prime mover to drive the single electric motor-generator, with the single electric motor-generator disconnected from the transmission, to generate electric power.

8. The powertrain of claim 7, further comprising an export power inverter operable to export the electric power generated by the single electric motor-generator in the standing recharge mode.

9. The powertrain of claim 1, wherein the plurality of powertrain operating modes includes a hybrid electric vehicle (HEV) mode, wherein in the HEV mode the controller is configured to engage and disengage the single prime mover and the first clutch to maintain a state of charge (SOC) of the battery within an oscillation range about a target.

10. The powertrain of claim 9, wherein the controller is configured raise the target and increase the oscillation range based on a power train load of said powertrain.

11. The powertrain of claim 9, wherein the controller is configured raise the target and increase the oscillation range based on a location of the powertrain and a database correlating locations and SOC targets.

* * * * *